US008826472B2

(12) United States Patent
Hoernig et al.

(10) Patent No.: US 8,826,472 B2
(45) Date of Patent: Sep. 9, 2014

(54) BATH SYSTEM

(75) Inventors: Victor Hoernig, Lowell, IN (US);
Charles A. Patterson, Durango, CO (US)

(73) Assignee: Masco Corporation of Indiana, Indianapolis, IN (US)

(*) Notice: Subject to any disclaimer, the term of this patent is extended or adjusted under 35 U.S.C. 154(b) by 750 days.

(21) Appl. No.: 12/533,293

(22) Filed: Jul. 31, 2009

(65) Prior Publication Data
US 2010/0037385 A1 Feb. 18, 2010

Related U.S. Application Data

(60) Provisional application No. 61/189,054, filed on Aug. 15, 2008.

(51) Int. Cl.
*A47K 3/00* (2006.01)
*E03C 1/24* (2006.01)

(52) U.S. Cl.
CPC .. *A47K 3/003* (2013.01); *E03C 1/24* (2013.01)
USPC .................................................. 4/607; 4/612

(58) Field of Classification Search
USPC ............. 4/605, 607, 609, 611, 612–614, 557, 4/555, 556; D23/279, 283
See application file for complete search history.

(56) References Cited

U.S. PATENT DOCUMENTS

| | | | |
|---|---|---|---|
| 1,076,808 A | 10/1913 | Arburg | |
| 1,197,657 A | 9/1916 | Orofino | |
| 1,432,916 A | 10/1922 | Schwartz | |
| 1,781,325 A | 11/1930 | Dowling | |
| D93,254 S | 9/1934 | Tilden | |
| 2,048,909 A | 7/1936 | Woodworth | |
| 2,052,629 A | 9/1936 | Hodgson | |
| 2,237,076 A | 4/1941 | Kenney et al. | |
| D129,038 S | 8/1941 | Fensch | |
| 2,269,748 A | 1/1942 | Widman | |
| 2,520,508 A | 8/1950 | Morrison | |
| 2,529,568 A | 11/1950 | O'Hara | |
| 2,678,083 A | 5/1954 | Dall et al. | |

(Continued)

FOREIGN PATENT DOCUMENTS

| | | |
|---|---|---|
| WO | 2006/015435 | 2/2006 |
| WO | W02007/004863 | 1/2007 |
| WO | W02007/086734 | 8/2007 |

*Primary Examiner* — Huyen Le
*Assistant Examiner* — Janie Christiansen
(74) *Attorney, Agent, or Firm* — Carlson, Gaskey & Olds, PC

(57) ABSTRACT

A bath environment, such as a tub or shower, has a seat upon which a user sits, and a first panel, usually glass, for enclosing a first portion of the bath environment proximal to the seat. The first panel has a width roughly correlated to a width of the seat to allow a user easy access to the seat and to the panel to manipulate the panel. The invention also has a second panel for enclosing a second portion of the bath environment. The second panel has a hinge and a pair of partitions connected by the hinge so that the partitions pivot about the hinge to allow access to the bath environment distal from the seat. Also included is a stanchion that is disposed on and extends upwardly from an outer edge of the bath environment to a given height. The first panel has a length that extends downwardly from an upper region of the bath environment and ends at the height of the stanchion.

20 Claims, 10 Drawing Sheets

(56) References Cited

U.S. PATENT DOCUMENTS

| | | | |
|---|---|---|---|
| 2,813,276 A | 11/1957 | Lanza | |
| 2,851,695 A * | 9/1958 | Dietrich | 4/567 |
| 3,334,358 A | 8/1967 | McPherson | |
| 3,443,266 A | 5/1969 | Mongerson et al. | |
| 3,568,220 A | 3/1971 | Dees | |
| 3,955,219 A * | 5/1976 | Finch et al. | 4/552 |
| 3,967,323 A | 7/1976 | Serio | |
| 4,168,549 A | 9/1979 | Davies | |
| 4,364,132 A | 12/1982 | Robinson | |
| 4,400,835 A | 8/1983 | Richter | |
| 4,495,666 A | 1/1985 | Herman, Jr. | |
| 4,646,491 A | 3/1987 | Munch | |
| 4,680,817 A * | 7/1987 | Sloan et al. | 4/663 |
| 4,876,751 A | 10/1989 | Van Meter | |
| 4,878,530 A * | 11/1989 | Jean | 160/211 |
| 4,897,889 A | 2/1990 | Baus | |
| 4,905,327 A | 3/1990 | Boublil | |
| 4,981,164 A * | 1/1991 | Reichel | 160/187 |
| 5,056,169 A | 10/1991 | Roguebrune | |
| 5,185,892 A | 2/1993 | Mitchell | |
| 5,343,576 A | 9/1994 | Dannenberg et al. | |
| 5,357,639 A | 10/1994 | Zellner | |
| 5,446,929 A | 9/1995 | Sills et al. | |
| 5,463,780 A | 11/1995 | McAllister et al. | |
| 5,671,489 A * | 9/1997 | Salach | 4/614 |
| 5,720,056 A | 2/1998 | Aymes | |
| 5,893,181 A * | 4/1999 | Moncaster | 4/557 |
| 6,088,847 A | 7/2000 | Burrow | |
| 6,094,757 A | 8/2000 | Torres | |
| 6,109,189 A | 8/2000 | Tarver | |
| 6,145,140 A | 11/2000 | Fernie et al. | |
| 6,226,808 B1 * | 5/2001 | Walshe | 4/552 |
| 6,226,810 B1 | 5/2001 | Weddendorf et al. | |
| 6,360,380 B1 | 3/2002 | Swart et al. | |
| 6,408,456 B1 | 6/2002 | Fike et al. | |
| 6,427,258 B1 | 8/2002 | Gooley | |
| 6,470,512 B1 * | 10/2002 | Lau et al. | 4/612 |
| 6,618,871 B2 | 9/2003 | Kopacz et al. | |
| 6,643,861 B2 | 11/2003 | Sherlock et al. | |
| D491,254 S | 6/2004 | Shimizu | |
| 6,807,689 B1 | 10/2004 | Royko et al. | |
| 6,893,704 B1 | 5/2005 | van der Loo | |
| 6,912,740 B2 | 7/2005 | Fainberg | |
| 6,915,535 B2 | 7/2005 | Sieger et al. | |
| 7,007,315 B2 | 3/2006 | Stonecipher | |
| 7,121,620 B1 | 10/2006 | Fang | |
| 7,155,757 B1 | 1/2007 | Zamora, Jr. | |
| 7,392,551 B2 | 7/2008 | Lanius | |
| 7,392,553 B2 | 7/2008 | Uhl et al. | |
| 8,082,609 B2 | 12/2011 | Rydalch | |
| 2005/0102746 A1 | 5/2005 | Wright et al. | |
| 2005/0172394 A1 | 8/2005 | Ciechanowski et al. | |
| 2005/0246830 A1 | 11/2005 | Galyean et al. | |
| 2006/0236452 A1 | 10/2006 | Polimeno | |
| 2007/0050907 A1 | 3/2007 | Uhl et al. | |
| 2007/0067903 A1 | 3/2007 | Hatrick-Smith | |
| 2007/0199263 A1 | 8/2007 | Kern et al. | |
| 2008/0121771 A1 | 5/2008 | Sen | |
| 2008/0190048 A1 | 8/2008 | Kitakado | |

\* cited by examiner

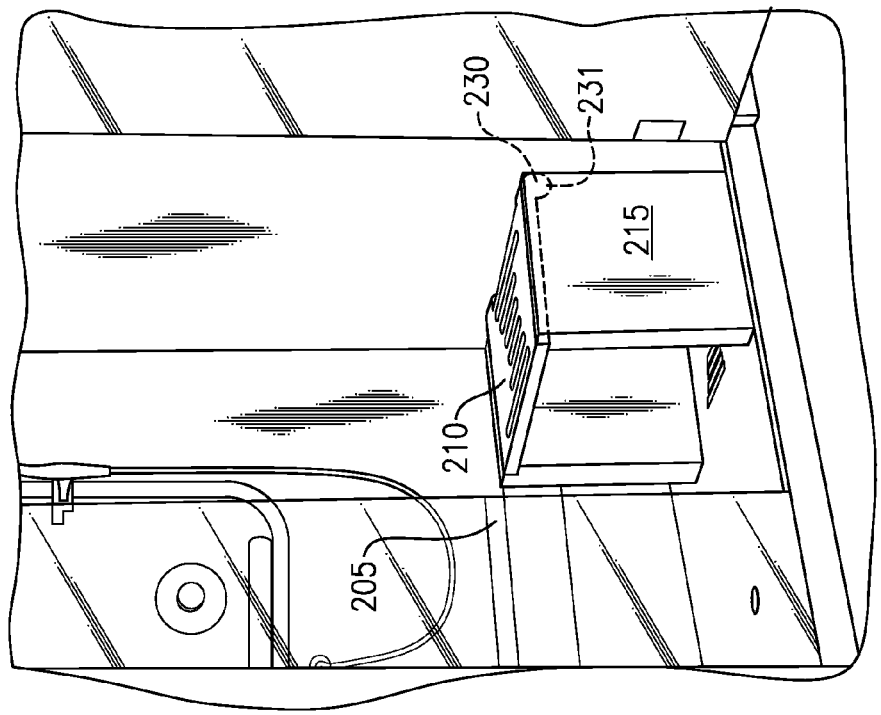
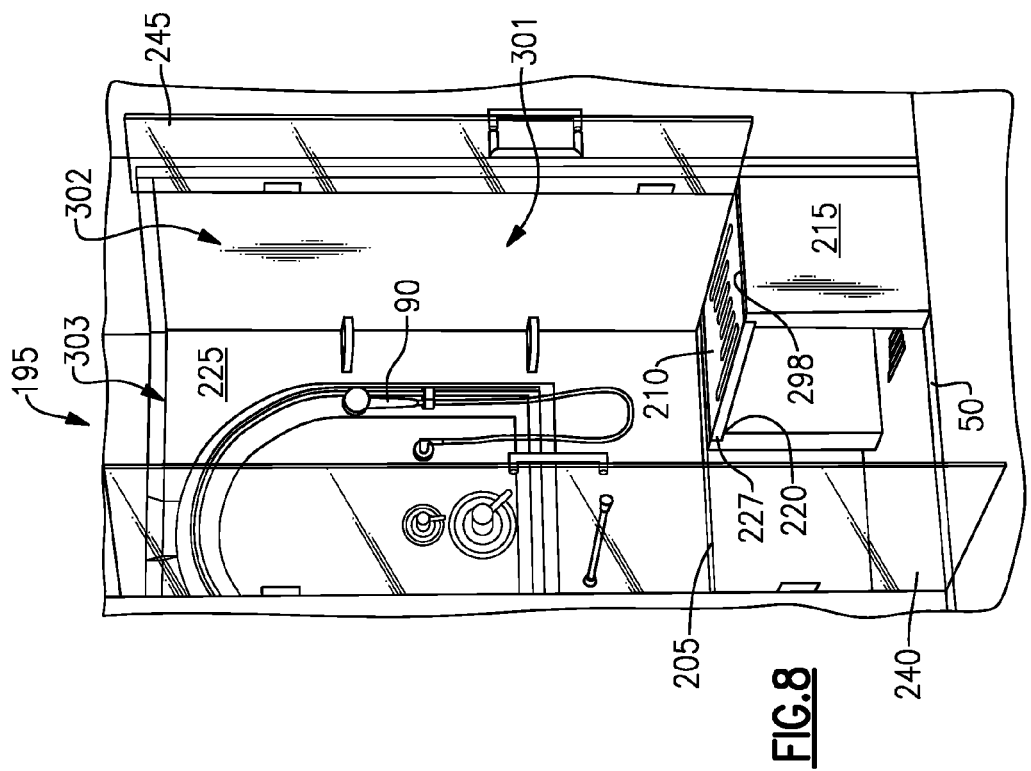

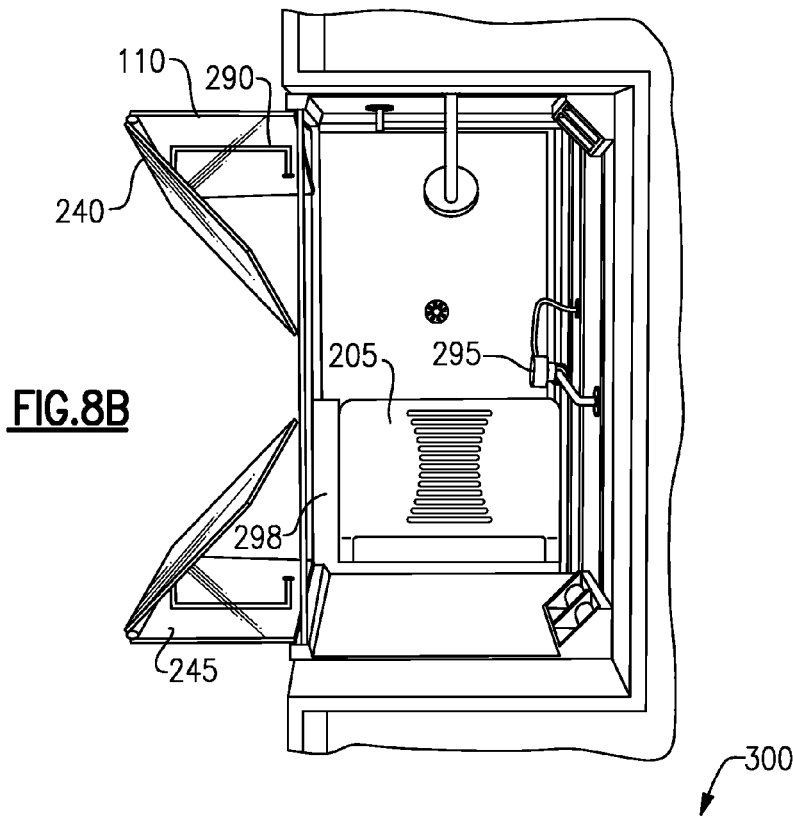
FIG. 8B
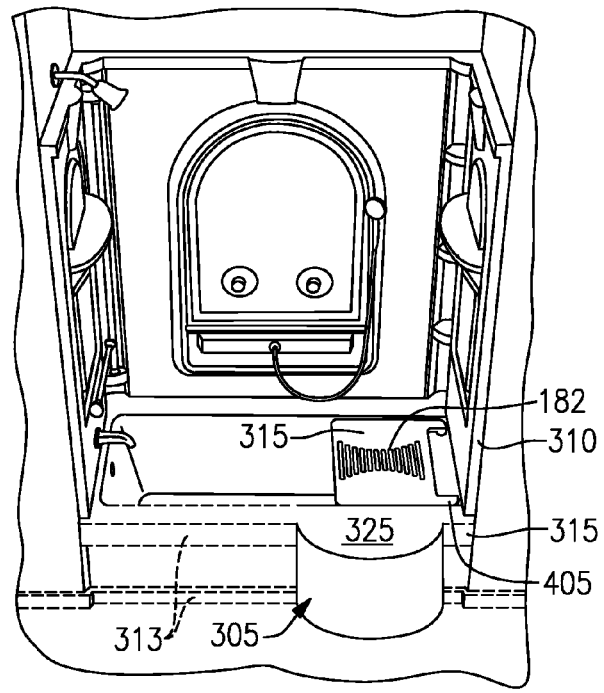
FIG. 9
FIG. 10

BATH SYSTEM

REFERENCE TO RELATED APPLICATION

This application claims priority to U.S. Provisional Application No. 61/189,054 filed Aug. 15, 2008. Cross reference is made to copending U.S. patent applications Ser. No. 12/533,046 entitled "Bath System"; Ser. No. 12/533,094 entitled "Bath System"; Ser. No. 12/533,103 entitled "Bath System"; Ser. No. 12/533,238 entitled "Bath System"; Ser. No. 12/533,293 entitled "Bath System"; Ser. No. 12/533,404 entitled "Bath System".

BACKGROUND OF THE INVENTION

Bath showers and tubs have many features. Some baths and showers include seats and benches. Some seats are fixed to the interior of tubs and showers. Other seats are arranged on slides to allow a user to, in essence, ride the seat from the exterior of a tub to the interior of the tub and back.

Showers typically have a threshold over which a user must step to enter into a shower. The threshold typically serves to keep water from escaping from the shower.

Some bath and shower fixtures attach grab bars thereto to provide hand holds for users.

Both shower and shower/bath fixtures use doors, typically glass, and curtains, typically plastic, to keep water from escaping from the shower enclosure during use.

Some bath and shower units provide shelves for storage of bath materials such as soap, shampoo, toys and the like.

SUMMARY OF THE INVENTION

According to the invention, a bath environment, such as a tub or shower, has a seat upon which a user sits, and a first panel, usually glass, for enclosing a first portion of the bath environment proximal to the seat. The first panel has a width roughly correlated to a width of the seat to allow a user easy access to the seat and to the panel to manipulate the panel. The invention also has a second panel for enclosing a second portion of the bath environment.

According to an embodiment of the invention, a second panel is included that has a hinge and a pair of partitions connected by the hinge so that the partitions pivot about the hinge to allow access to the bath environment distal from the seat.

According to a further embodiment of the invention, the bath environment also includes a stanchion that is disposed on and extends upwardly from an outer edge of the bath environment to a given height. The first panel has a length that extends downwardly from an upper region of the bath environment and ends at the height of the stanchion.

BRIEF DESCRIPTION OF THE DRAWINGS

These and other features of the present invention can be best understood from the following specification and drawings, the following of which is a brief description.

FIGS. 8, 8A and 8B illustrate a shower surround showing an embodiment of a shower bench;

FIG. 9 illustrates a top view of a shower surround of FIG. 8;

FIG. 10 illustrates a plan view of a tub surround;

DETAILED DESCRIPTION

Figure 1:
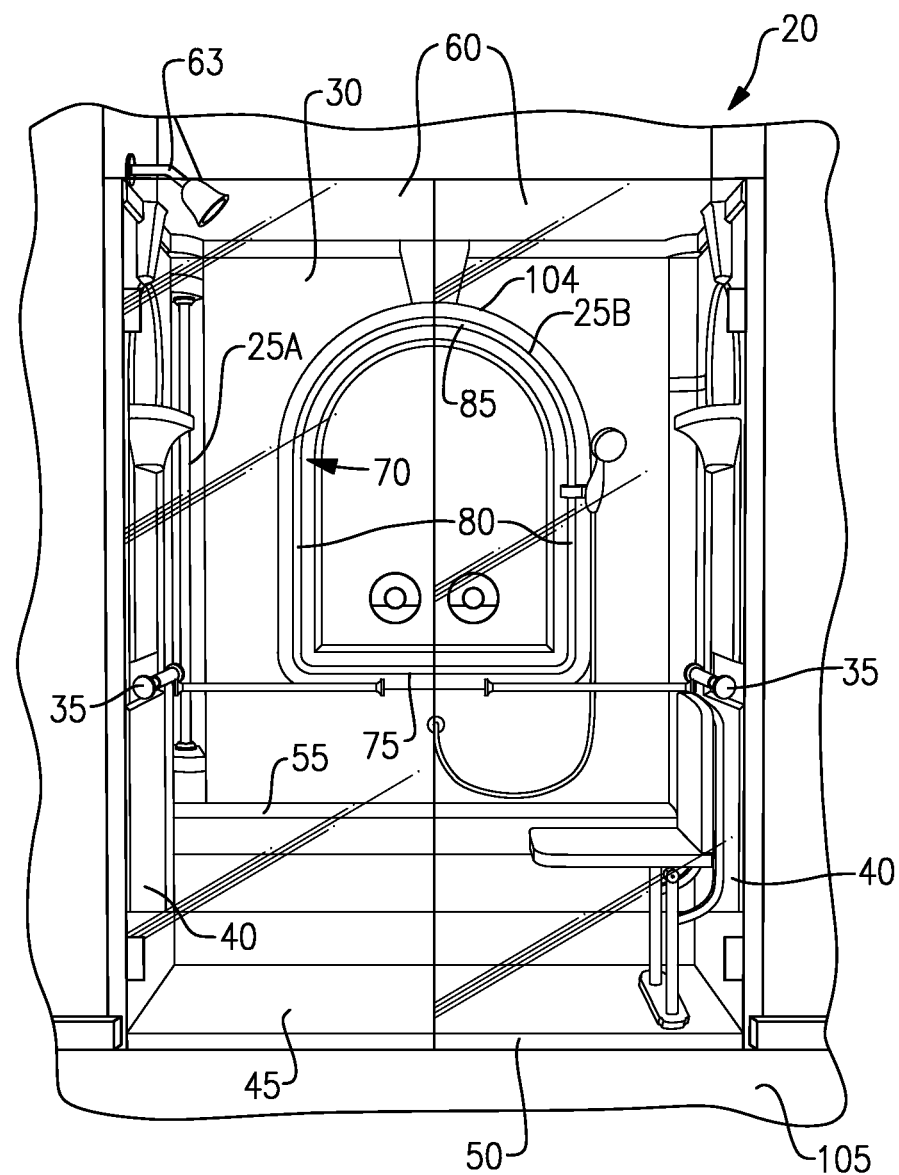
FIG. 1 illustrates a plan view of a shower surround.
Figure 2:
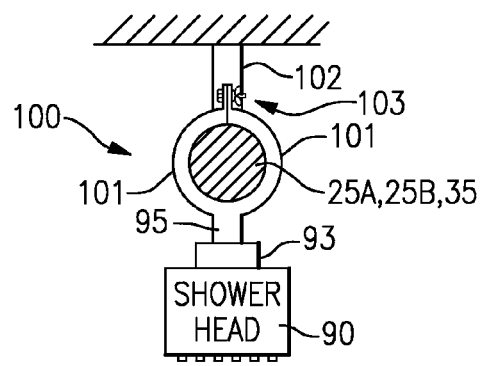
FIG. 2 is a schematic sectional view of a handheld showerhead mounted to a handrail.

Referring now to FIGS. 1 and 2, a shower surround 20 that includes a pair of grab bars 25(a-b) against a back wall 30 of the shower, a grab bar 35 at each end wall 40 of the shower, a floor 45 incorporating a zero threshold drain 50, a knee wall 55 in the back wall 30 of the shower and a pair of shower doors 60 is illustrated. A fixed showerhead 63 may also be provided in or above one end of the shower surround 20.

At the back wall 30 of the shower 20, there is a vertically placed grab bar 25a and a cathedral shaped grab bar 25b. Similarly, grab bars 35 are placed on end wall 40 to provide hand holds for a user. The cathedral shaped grab bar 25b is placed in a recess 70 in the back wall 30, the cathedral-shaped grab bar having a bottom portion 75, two upwardly extending leg portions 80, and an arcuate section 85 connecting the tops of the two leg portions is placed therein. The grab bars are attached to end and side walls 30, 40 by means known in the art by mounts 102 (see FIG. 2).

As may be seen in FIG. 1, a hand-held shower head is appended to the cathedral shaped grab bar 25b to enable a user to hold a shower head in the desired position and wash himself as will be described hereinbelow. The hand-held shower head may also be appended to grab bars 35 and 25a.

Referring now to FIG. 2, it is seen that the hand-held shower head 90 is held by conventional means (93) on a bracket 95 which has a clamping mechanism 100. The clamping mechanism creates a friction fit with a grab bar and be either a flexible plastic piece having legs 101 that will grasp the grab bar and be flexible enough to be removed from the grab bar and still grab the grab bar, or a screw-down mechanism 102, as is known in the art, that will hold the bracket in place on the cathedral-shaped grab bar 25b (or other grab bar 25 having a same diameter as grab bar 25b) so that the bracket may be disposed in any position a user deems necessary along that grab bar. The clamping mechanism 100 engages at least partially around handrail 25b so as to permit movement of the legs 101. That is, the handheld showerhead 90 may slide from post to post around the entirety of the handrail/grab bars 25b to thereby position the handheld showerhead 90 at any position. If a user wishes to position the handheld showerhead 90 around a second pair of posts 90, the clamping mechanism 102 must be detached and reattached thereround. By appending the hand-held to the cathedral-shaped grab bar, a user may then place the shower head in the ideal place to wash and rinse herself. It should be understood that the handrail may be configured with particular radiuses and shapes, even in the z-axis (see FIG. 3) so as to permit this slideable movement. Furthermore, it should be understood that the handrail/grab bars 25, 35 may be of various configurations, shapes, orientations, and arrangements other than that illustrated herein to place the grab bar 25b both ideally to support a user and to place a shower head. The arcuate section 85 may extend into the shower 20 (see FIG. 3).

By integrating the shower head with the grab bars, a user may understand that he can hold the shower head support if desired while manipulating the shower head because the shower head support is the grab bar.

Figure 3:
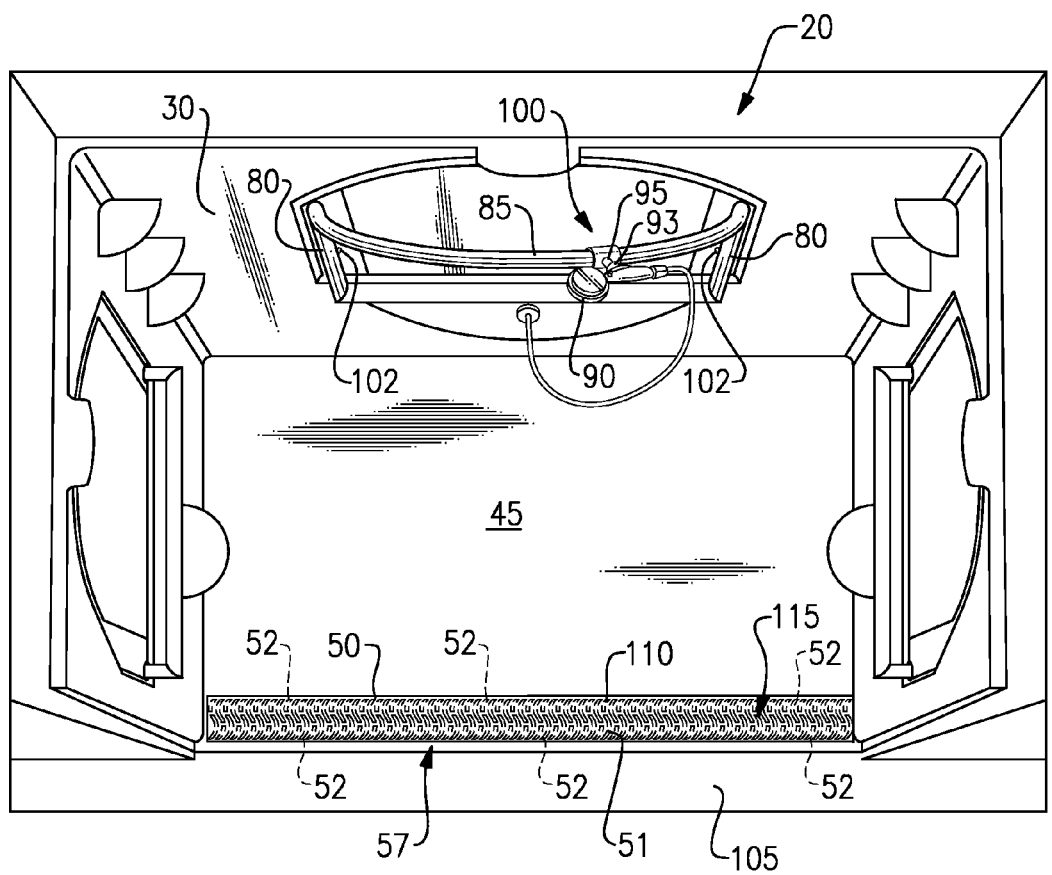
FIG. 3 illustrates a top perspective view of a shower surround.

Referring now to FIG. 3, the shower surround 20 includes the floor 45 that inclines slightly towards the integral drain 50 that is flush with the floor 45 of the shower and the floor 105 of the bathroom. The incline is slight so a wheel chair will not be impeded by the steepness of incline if entering the shower surround. The drain 50 has a plurality of slots and grooves 110 that are roughly transverse to an axis 115 of the drain so that water flowing from the shower floor 45 does not have a straight path to the bathroom floor 105 to minimize flow from the shower to the bathroom floor 105. The drain and floor 45 create no threshold barrier that a user has to step over or that would likely impede access or egress to the shower 20. One of ordinary skill in the art will recognize that the slots 110 may have different shapes or frequency to minimize the flow of water from the floor 45 to floor 105 of the bathroom.

Figure 4:
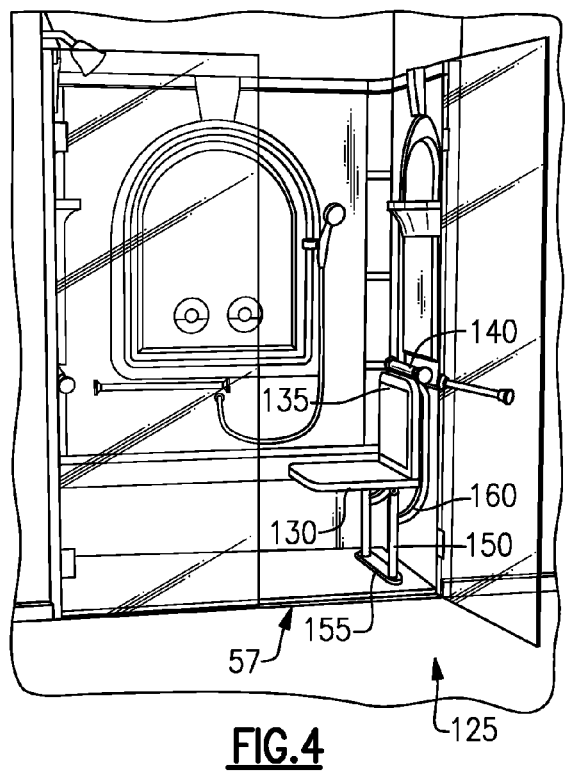
FIG. 4 illustrates a shower surround according to another non-limiting embodiment.
Figure 5:
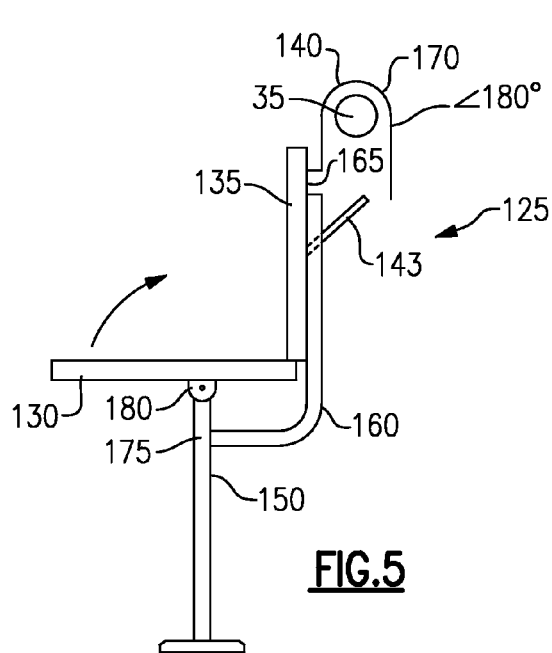
FIG. 5 illustrates an embodiment of the shower chair of FIG. 4.

Referring to FIGS. 4 and 5, an embodiment of a chair 125 that is designed for use in the shower 20 are shown. The chair 125 shown in FIG. 4 is comprised of a seat 130, a seat back 135, a stabilizing bracket 140, a spring 143 attached to the stabilizing bracket 140, a pair of legs 150, a weight distribution support 155 and support arms 160.

Figure 6:
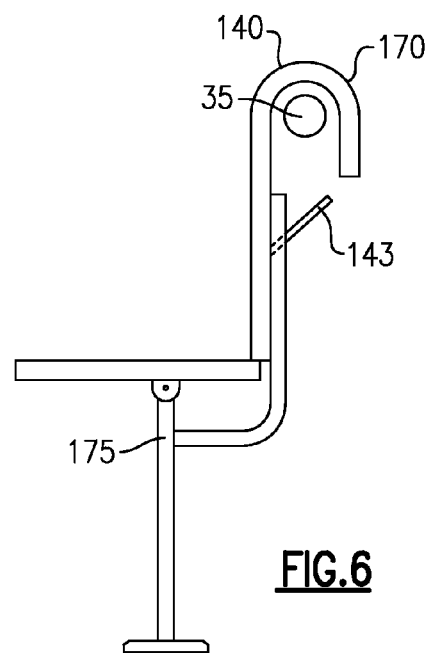
FIG. 6 illustrates another schematic embodiment of the shower chair shown in FIG. 4.

The stabilizing bracket 140 is attached to the upper back 165 of the seat back 135 (see FIG. 5) by conventional means like screws or brads (not shown) or is integral therewith (see FIG. 6). The brackets have an arcuate portion 170 that has a diameter that is greater than a diameter of grab bars 35 and that curves less than 180° so that the bracket 140 and the chair 125 thereby are removably attached to the grab bars 25a, 25b, or 35. The brackets do not support the weight of a user but serve to prevent the chair 125 from tipping forward. The spring 143 is also attached to the bracket or is integral therewith and tends to resist force that pushes the spring back to the bracket. The weight of the user is transferred from the seat 130 to the floor 45 via legs 150 and weight distribution support 155.

The seat back is attached to the legs 150 by means of support arms 160 which attach to the seat back below the stabilizing bracket 140 by conventional means and attach to a mid portion 175 of legs 150 also by conventional means. The seat has a pair of downwardly depending flanges 180 which conventionally attach to the legs 150 while allowing the seat to pivot thereabout. The legs 150 conventionally attach at their lower end to the weight distribution support 155 that serves to distribute the weight of a user across a greater area of the shower floor 45 to minimize the ends of the legs from damaging the floor 45.

Figure 7:
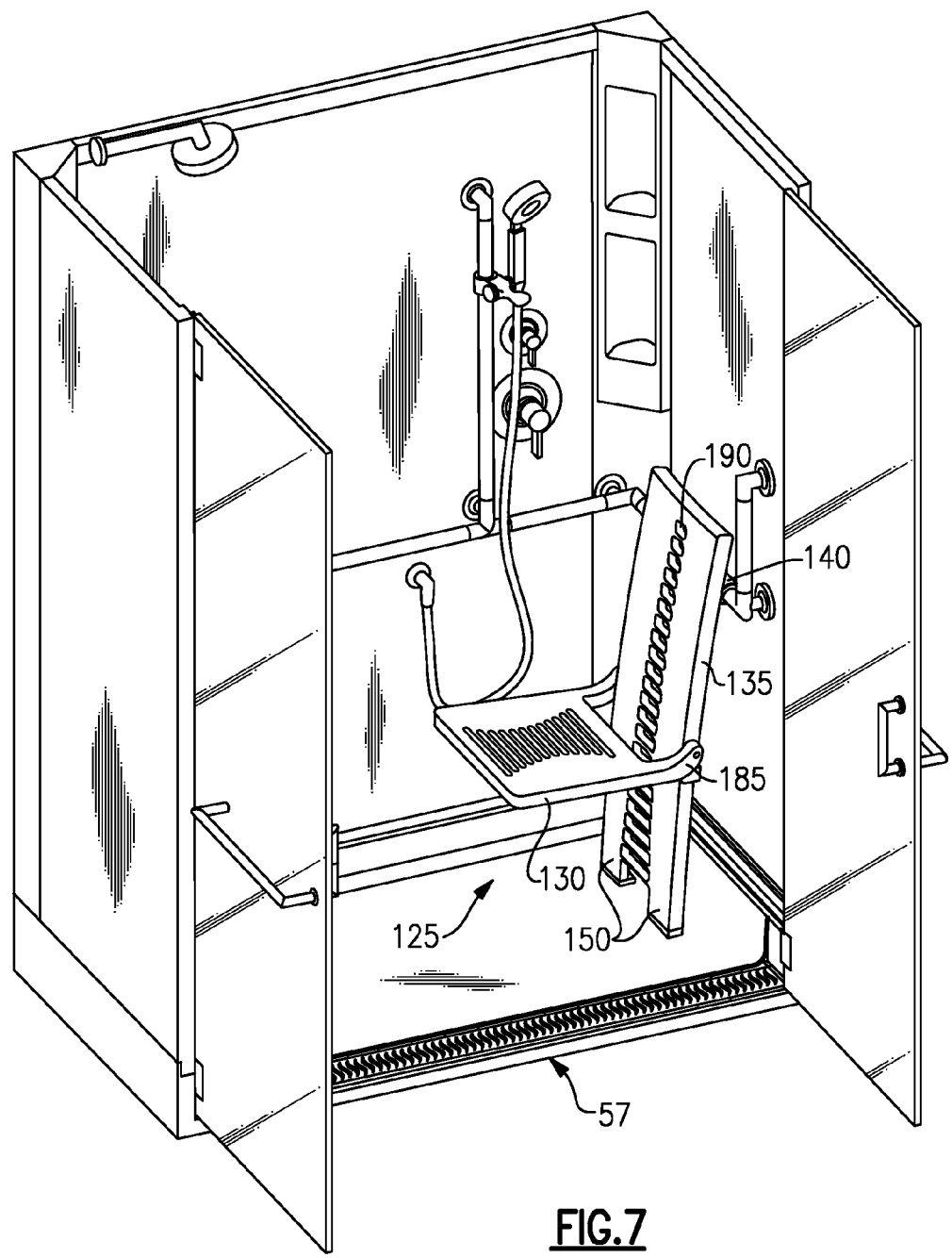
FIG. 7 illustrates a plan view of another embodiment of a shower chair shown in a shower surround.

The chair 125 is made of water resistant material like plastic, wood or metal. As shown in FIG. 5, the seat has a plastic seat with a water-resistant foam top for user comfort. The chair 125 shown in FIG. 7 is all plastic with slots 182 to allow for water run-off and quick drying. Also, the slots 182 in seat 125 are hygienically designed to allow a user to wash his or her undersides (not shown) without undue movement by directing spray from under the seat to that underside area. The slots tend to be wider at a user's underside portions to allow cleaning thereof.

To use the chair, one places the bracket 140 over a grab bar 25 while depressing the spring 143 to allow the grab bar 35 to nestle within the arcuate portion 170, locates the weight distribution support 155 and flips down the seat 130. When not in use, a user simply flips up the seat 130 and leaves the chair in place. If more space is necessary, or the chair needs cleaning, a user simply flips up the seat and, because of the dimensions of the arcuate portion 170, simply depresses the spring 143 and lifts the chair and the bracket 140 up over the bar for removal. The spring minimizes the probability that the chair will be pushed off the bracket when it is not intended to remove the chair. If the chair is lifted or pushed upwardly, the spring catches the grab bar 35 and prevents removal of the chair from the grab bar. One of ordinary skill in the art will recognize that other types of devices such as clamps, flexible over-center grips and the like may be used to prevent the removal of the chair if not desired by a user.

Referring now to FIG. 7, another embodiment of a chair is shown. Similar to FIGS. 4-6, the chair 125 is comprised of a seat 130, a seat back 135, and a stabilizing bracket 140. However, the seat back also has: a pair of legs 150 whereby the seat back and legs are integrally formed; pair of horizontally disposed flanges 185 extending therefrom; and a plurality of horizontal slots 190 that increase in width from the top of the seat back to the bottom thereof both to allow water to drain and to present an appealing design. The legs 150 are wider at the bottom to distribute the weight of a user across a greater area of the shower floor 45 to minimize damage thereto. The seat 130 is conventionally attached to the flanges 185 to allow the seat to pivot upwardly. The stabilizing bracket 140 acts like the seat bracket as shown in FIGS. 4-6. It does not support the weight of a user and allows for easy removal of the chair from the any of the grab bars at the appropriate height, e.g., 25b, 35, because the arcuate portion 170 of the stabilizing bracket is less than 180° and has a diameter that is greater than the diameter of the grab bars as stated herein above.

Referring now to FIG. 8, a shower surround 195 according to another non-limiting embodiment is illustrated. The shower surround 195 includes a zero threshold drain 50, a knee-wall 205, a bench seat 210, and a pedestal 215 disposed at the front of the shower surround.

Referring now to FIG. 9, a top view of the shower surround of FIG. 8 is shown. The pedestal 215 is essentially a rectangular solid, but as one of ordinary skill in the art will recognize, the pedestal may have other shapes and decorative features so long as it can support the bench seat 210. The pedestal may be either permanently affixed to the shower floor 45 or may be removable therefrom to enable a user to have more room in the shower 195. The knee wall may have a longitudinal portion 220 that juts away from the back wall 225 and the rest of the knee wall so that bench seat 210 is supported by the longitudinal area 220 and the pedestal 215. The pedestal may also fit in groove 227 shown in FIG. 8. FIG. 9 also shows a slot 320 in which a shower curtain may slide to minimize water splashing out of the shower if the hinge 222 for bench seat 210 is attached to the bench seat and a tub wall (not shown.

The bench seat may either sit on the longitudinal portion 220 of the knee wall and the pedestal 215 and thereby be easily removed from the shower surround 195 if desired, or may be fixedly hinged as shown in FIG. 9 or hinged via an integrated, arcuate portion 230 that fits into a corresponding arcuate recess 231 in pedestal 215 and knee-wall 205. The arcuate recess 231 is less than 180° so that the parts can be easily separated. One of ordinary skill can appreciated that the arcuate portion and arcuate recess can be in either of the seat or the knee-wall and the pedestal. A user would then be able to flip the bench seat up (or down) and out of the way, or removed by separating the pieces 230 and 231 from each other, if more space is desired. As with other seats disclosed herein, the seat may be slotted to allow for hygiene and water runoff; padded for user comfort; and, have other decorative and functional features. Also as noted herein, the bench seat 210 may be manufactured of wood, metal or other suitable material.

The bench seat 205 is generally flush with a pedestal 215 when flipped down (FIG. 8) or on top of the pedestal (see FIG. 8*a*) to allow a user to easily slide his bottom across the pedestal and sit on the bench seat 205.

Referring to FIGS. 8 and 8(*b*), there are typically shower curtains (not shown) or translucent doors 240, 245 (see the Figures) to minimize splashing or other flows of water onto the showerroom floor. Door 240 is either a single panel or a bi-fold that prevents the flow of water onto the bathroom floor between the shower sidewall away from the bench seat by extending above shower head 90 (see FIG. 8). The other door 245 covers area at the back of the shower closest to the bench seat so that a user or an aide may have easy access to the bench seat. Door 245 typically has a narrower width than door 240. The door 240, if a bi-fold, facilitates access into the shower surround 195 while a swing out door 245 is located adjacent the bench seat 205. The doors 240, 245 are readily accessed from a seated position. For instance, a user can open door 245 and door 240 from a wheelchair, slide himself across to bench seat 205, reach to close door 245 which is close because of its relatively short horizontal width and grasp a bar 290 disposed on the bi-fold door 240 and pull door 240 closed. The user is now free to use the close controls 295. It can be seen at FIG. 8 that the 210 seat upon which a user may sits has its entire width W extending along a front edge (e.g., integral drain 50) and that the shower head 90 is disposed above the seat 210 such that a user may be covered by water passing from said shower head 90. It can also be seen from FIG. 8 that the door 245 encloses an area 301 that is in registration with a top 298 of the pedestal and the width W of the seat 210 and that extends above the seat to an area 302 above the shower head 90. The door 245 has a width correlated to the width W of the seat 210 to allow a user easy access to the seat and to the door 245 to manipulate the door 245. Door 245 encloses a third area 303 extending below the top edge of the seat and adjacent the second area.

According to an embodiment of this invention, the door 245 need only extend down to a top 298 of the pedestal thereby reducing the weight and cost of the door. In this embodiment, the pedestal and the shorter door cooperate (see abutted doors 40, 45 shown in FIG. 1) to minimize water escaping from the shower surround. The doors 240, 245 are in plane with each other if closed (see FIGS. 1 and 8) and define a front of said shower surround 20 (e.g., the environment). The pedestal 215 is in roughly in plane with door 245 is closed (see FIGS. 1 and 8).

Referring now to FIG. 10, a shower/bath enclosure 300 is shown. The enclosure 300 includes an integral access bench 305 which extends from an outside wall 310 of the enclosure 300. The integral access bench is about 18" high to accommodate the usual height of wheel chairs which tend to be between 17 and 19 inches in height. The shower/bath enclosure is shown here as a shower but may also be used as a tub (see dotted lines 313 in FIG. 10). The enclosure may further include a flip-up seat 315 as is taught herein. The access bench 305 is shown as an integrally molded portion having a half-circular sitting area 325. One of ordinary skill in the art will recognize that the access bench may be of different sizes and shapes to improve the esthetics and functionality thereof as long as the access bench allows a user to sit on the bench, pivot, and slide over to the bench seat while lifting ones legs over the surround wall, if any, and thereby be enabled to use the shower. One of ordinary skill in the art will also recognize that the doors 240, 245 may also be used herein instead of a shower curtain to enable a user to take advantage of the short door 245 and the door 240 and still have easy access to both as taught hereinabove. Also, the slots 182 in seat 315 are hygienically designed to allow a user to wash his or her bottom area (not shown) without undue movement by directing spray from under the seat to that bottom area.

Figure 11:
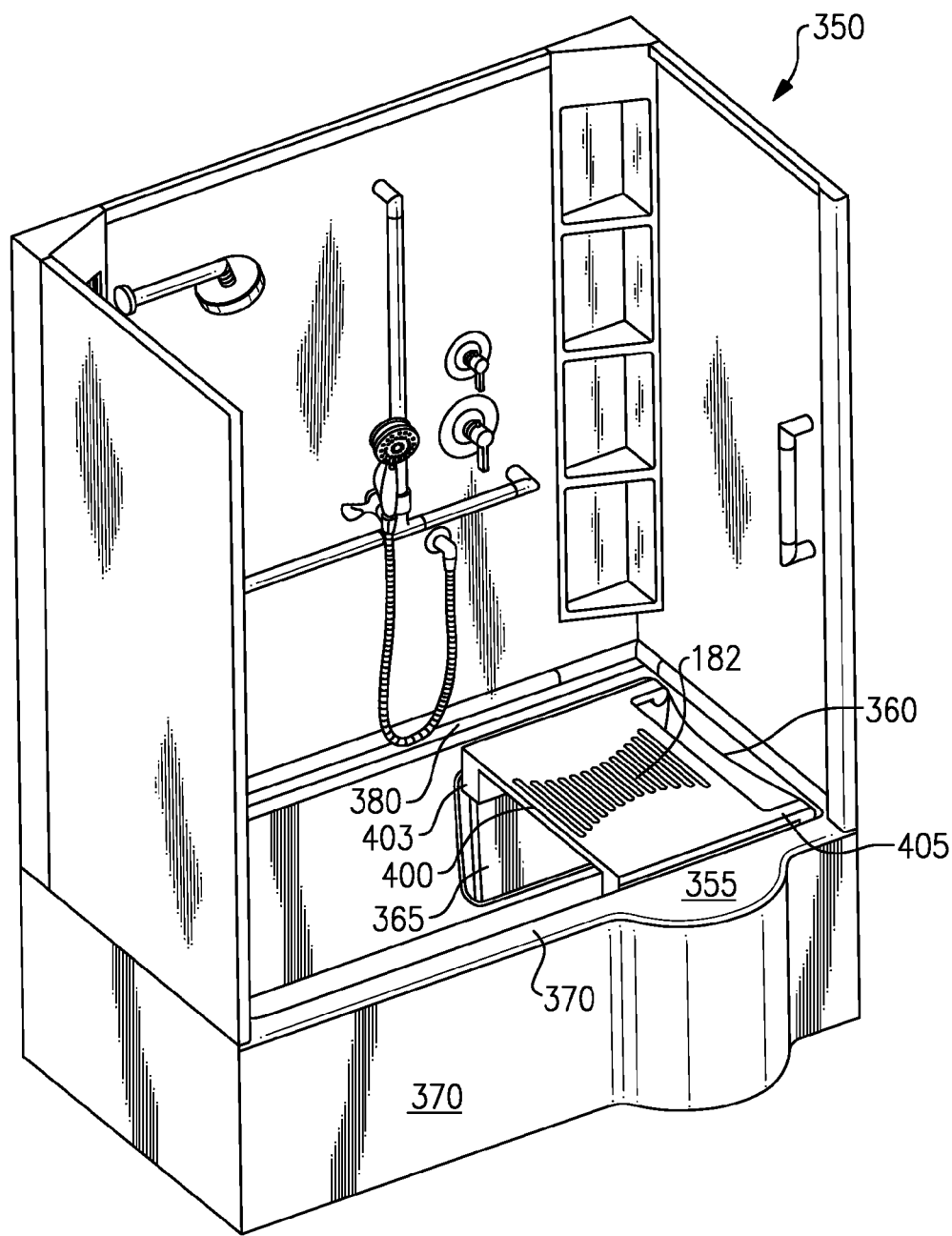
FIG. 11 illustrates another plan view of a shower and tub surround.
Figure 12:
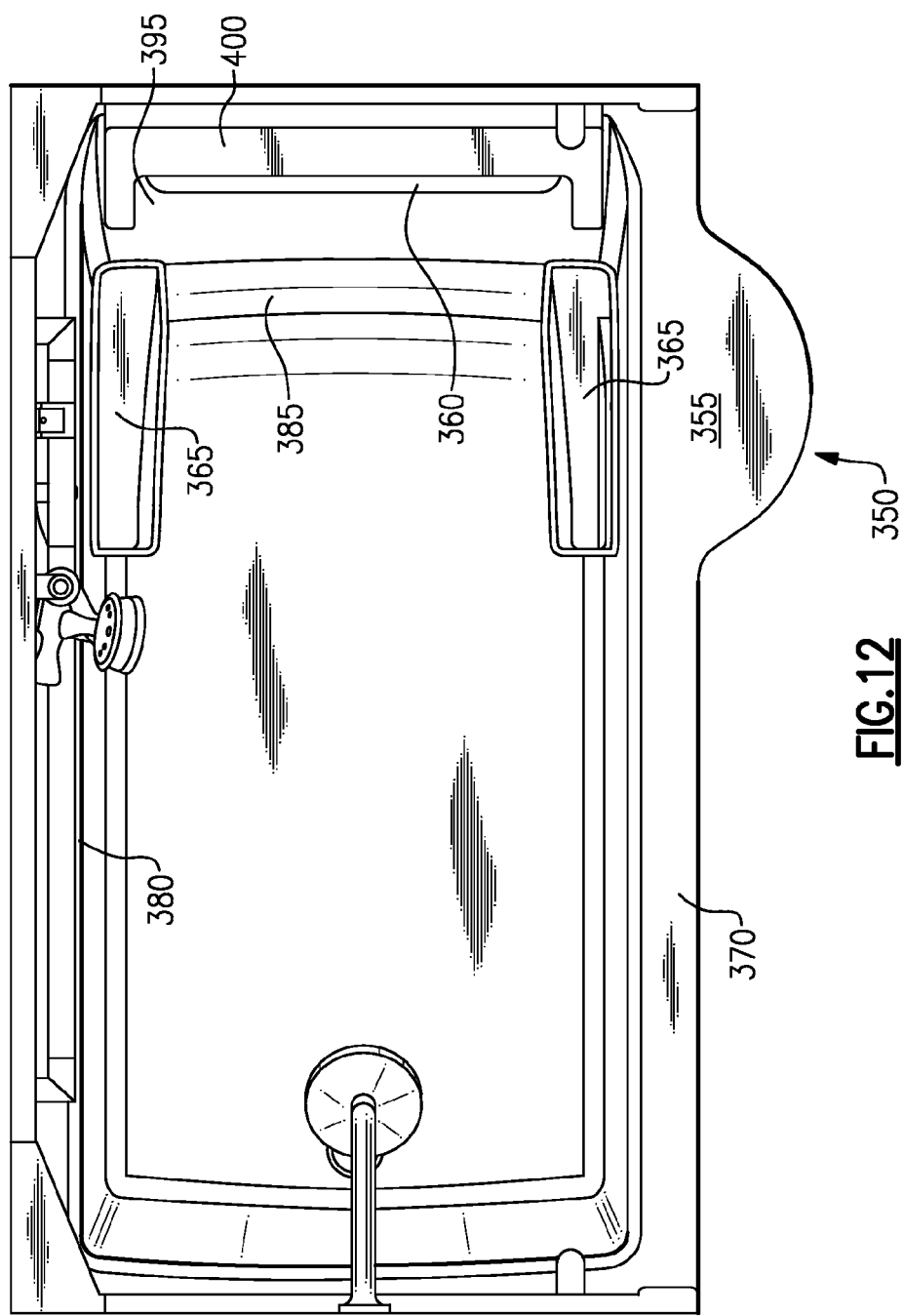
FIG. 12 illustrates a top plan view of the shower and tub surround of FIG. 11.

Referring now to FIGS. 11 and 12, a tub surround 350 is illustrated and includes a transfer bench 355, a head rest/pillow 360, and armrests 365. Arm rests 365 jut inwardly towards the interior of the tub surround 350 from front wall 370 and back wall 380, and a sloping back rest 385. The head rest/pillow 390 is attached to a top portion 395 (see FIG. 12) of the back rest 385. A seat 400 has a pair of side arms 405 that attach to the front wall 370 and back wall 380 by conventional means 410 so that the seat 400 may pivot up and out of the way if more room is desired in the tub surround 350. The seat 400 also has a pair of downwardly displaced flanges 403 that rest on the armrests 365 The arm rests 365 also function as a support of the seat 400 via the flanges 403 when the seat is not pivoted up and if the user desires to sit thereupon. The arm rests and seat cooperate so that, when the seat is pivoted down, the seat is essentially flush with the front wall 370 so a user can slide across the front wall onto the seat if desired.

The arm rests 365 are contoured to mimic a comfortable position for a user's arms and, therefore, one will recognize that one of ordinary skill in the art may choose other shapes and contours as long as the arm rests conform with the seat to provide a surface that is comfortably flush with the front wall 370. The side arms 405 of the seat 400 extend past the sides of a pillow 360 when the seat is pivoted down so that the pillow 390 can be placed in an ideal position behind the seat (see FIG. 11) to support a user's head when the seat is pivoted upwardly and not interfere with the seat when the seat is pivoted downwardly atop the arm rests 365.

The seat 400 may be spaced from the front wall 370 by a dimension that allows a shower curtain room to pass between the front wall and the seat to minimize an amount of water from escaping from the tub surround 350 (see FIG. 9). One of ordinary skill in the art will also recognize that the doors 240, 245 as shown in FIGS. 8 and 8(*b*) may also be used herein instead of a shower curtain to enable a user to take advantage of the functionality of the doors 245 and 240 and still have easy access to the shower surround as taught hereinabove.

Figure 14:
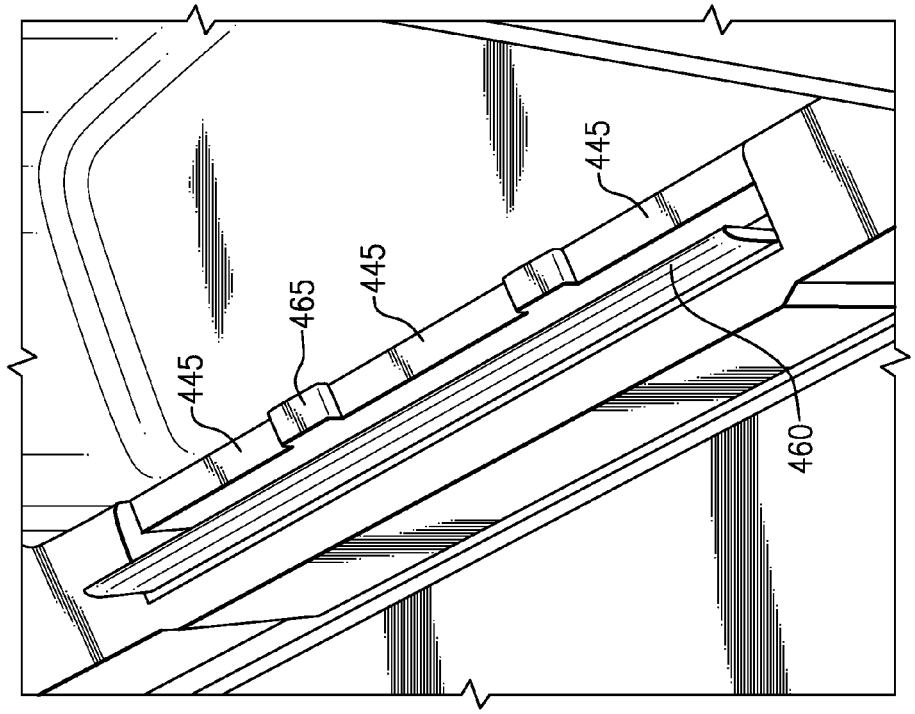
FIG. 14 illustrates a perspective view of an embodiment of a the storage compartment of FIG. 13.
Figure 13:
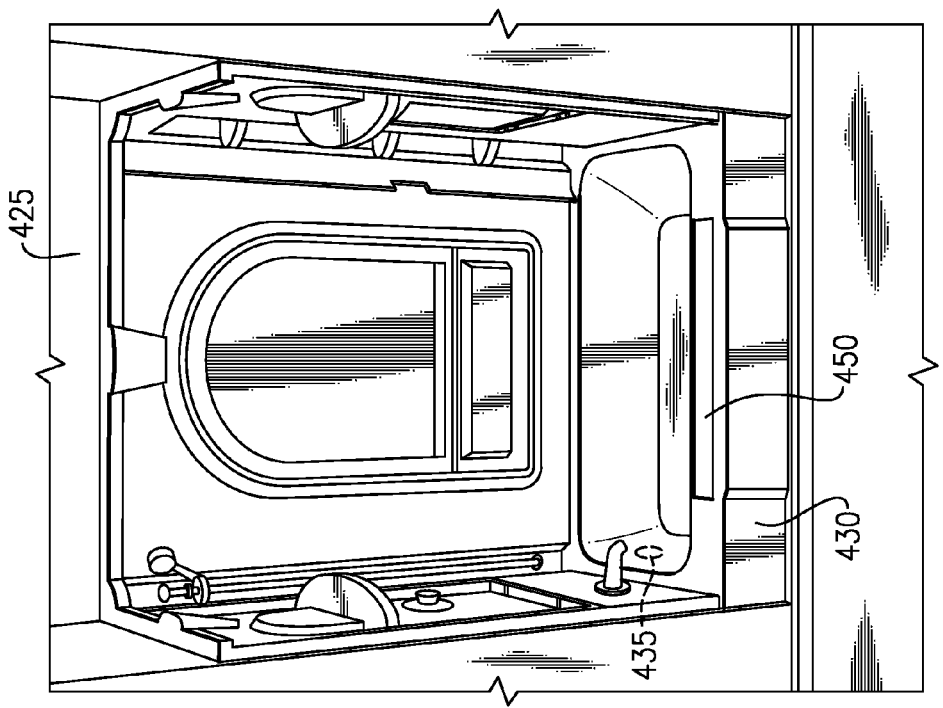
FIG. 13 illustrates a perspective view of an embodiment of a shower and tub surround including a storage compartment.
Figure 15:
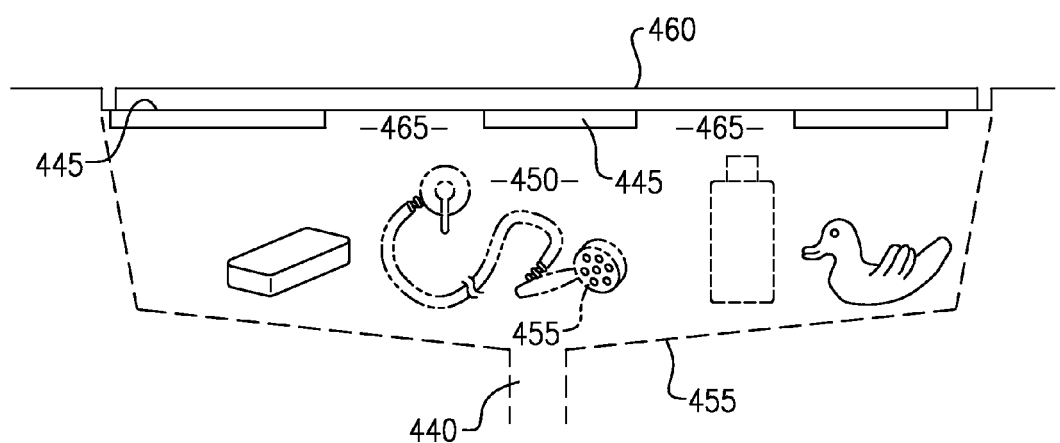
FIG. 15 illustrates a phantom view of the storage compartment of FIG. 14.

Referring to FIGS. 13-15, a tub and shower surround 425 according to another non-limiting embodiment is illustrated. Because the front wall 430 is relatively low, about 14 inches high, as compared to a normal tub having a wall that is about 18 inches high, to allow easier access to the tub and shower surround 425, water may not cover a user comfortably when bathing especially given the height of normal overflow drains (shown in phantom 435) placed under a tub spout 430. Normal overflow drains allow water to be about 13 inches deep in a full tub. According to this invention, overflowing water accesses a drain 440 though a plurality of scuppers 445 across the top of the water side of the side, front or rear walls of the tub and shower surround. Because the scuppers are at the top of the walls beginning about 13 inches from the bottom of the tub, the water in the tub and shower surround is as deep as a normal tub to give a user a comfortable and similar soak even though the front wall is only about 14 inches high. The ratio of the height of a tub wall to the depth of water in a normal tub is 18 inches to 13 inches or about 1.38. The ratio of the height of a tub wall to the depth of water in the tub of the invention is 14 inches to 13 inches or about 1.08.

The drain 440 is disposed within a cavity 450 in the front wall 430 (or other wall) of the bath and shower surround and has enough volume to store goods such as soap, shampoo, bath toys and other items deemed necessary or preferable for the bathing experience. The bottom walls 455 of the cavity are sloped towards the drain 440 to allow for complete drainage in the event of an overflow condition. The cavity 440 may have a pivotable cover 460 that closes for esthetics and to give easy access to the tub and shower surround 425. The cover should be flush with the top of the front wall so as not to provide an impediment to entering or exiting the tub. It should be understood that the cavity 450 may incorporate various other devices such as shower controls, separate handheld showers 455 that may be plumbed into the cavity as is known in the art, soap dispensers, as well as other devices (not shown).

The adjacent scuppers form a plurality of corbels 465 that are designed to support the cover if it is closed. The cover 465 may be relatively rigid to operate as a transfer seat or other support.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A shower environment comprising:
   a seat upon which a user sits in said shower environment;
   a first door that is translucent for enclosing a first portion of said shower environment proximal to said seat, said first door having a width correlated to a width of said seat to allow a user easy access to said seat and to said first door to manipulate said first door, said first door extending upwardly from a seat top such that water from a shower does not spray out of said shower environment, said first door not extending downwardly from said seat top;
   a second door that is translucent, separate from said first door, and in plane with each other if said doors are closed, said second door for enclosing a second portion of said shower environment; and
   wherein the shower environment is defined by at least a back wall, a pair of side walls facing each other, and an open front that is enclosed by the first and second doors, and wherein the widths of the seat and the first translucent door are defined in a direction extending between the pair of side walls.

2. The shower environment of claim 1 wherein said first door has a grip for closing and opening said first door.

3. The shower environment of claim 1 wherein said second door comprises:
   a hinge; and
   a pair of partitions connected by said hinge wherein said partitions pivot about said hinge to allow access to said shower environment distal from said seat.

4. The shower environment of claim 3 wherein a partition closest to said seat has a width roughly correlated to a width of said seat to allow a user easy access to said partition to close said second door.

5. The shower environment of claim 1 further comprising: a pedestal disposed on and extending upwardly from an outer portion of said shower environment to a given height wherein said pedestal is roughly in plane with said second door.

6. The shower environment of claim 5 wherein said first door has a length that extends downwardly from an upper region of said shower environment and ends at said height of said pedestal.

7. The shower environment of claim 5 wherein said pedestal supports said seat.

8. The shower environment of claim 1 wherein the width of the first door is at least as great as the width of the seat.

9. The shower environment of claim 1 including a pedestal disposed at the front of the shower environment, wherein the pedestal supports the seat.

10. The shower environment of claim 9 wherein the back wall includes a longitudinal portion projecting outwardly from the back wall, the longitudinal portion supporting a side of the seat opposite from the pedestal, and wherein the seat is selectively moveable relative to the pedestal and longitudinal portion between a use position and a stowed position.

11. A shower environment comprising:
    a seat upon which a user sits in said shower environment;
    a first door that is translucent for enclosing a first portion of said shower environment proximal to said seat, said first door having a width correlated to a width of said seat to allow a user easy access to said seat and to said first door to manipulate said first door, said first door extending upwardly from a seat top such that water from a shower does not spray out of said shower environment said first door not extending downwardly from said seat top; and
    a second door that is translucent, separate from said first door and in plane with each other if said doors are closed, for enclosing a second portion of said shower environment, wherein said second door comprises a hinge and a pair of partitions connected by said hinge, wherein said partitions pivot about said hinge to allow access to said shower environment distal from said seat, and wherein said second door is greater in length from its bottom to its top than said first door.

12. A shower environment, said environment comprising:
    a seat upon which a user sits in said environment, said seat having its entire width extending along a front of the shower environment,
    a shower head for disposal above a user, and disposed above said seat such that a user may be covered by water passing from said shower head,
    a first translucent door enclosing a first area of said environment that is in registration with atop edge and said entire width of said seat at said front and that extends above said seat to a second area above said shower head, said first translucent door having a width correlated to said entire width of said seat to allow a user easy access to said seat and to said door to manipulate said door; and
    a second translucent door for enclosing a third area of said shower environment, said third area of said environment extending below said top edge of said seat and adjacent said second area wherein said first translucent door and said second translucent door disposed with each other in plane cooperate to minimize water escaping from the shower surround and wherein said first translucent door and said second translucent door define said front of said environment.

13. The shower environment of claim 12 wherein the shower environment is defined by at least a back wall, a pair of side walls, and an open front that is enclosed by the first and second translucent doors, and wherein the widths of the seat and the first translucent door are defined in a direction extending between the pair of side walls.

14. The shower environment of claim 13 wherein the width of the first translucent door is at least as great as the width of the seat.

15. The shower environment of claim 14 including a pedestal disposed at the front of the shower environment, wherein the pedestal supports the seat.

16. The shower environment of claim 15 wherein the back wall includes a knee wall having a longitudinal portion projecting outwardly from the back wall, the longitudinal portion supporting a side of the seat opposite from the pedestal.

17. The shower environment of claim 16 wherein the seat is selectively moveable relative to the pedestal and longitudinal portion between a use position and a stowed position.

18. The shower environment of claim 16 wherein the seat is flush with a top surface of the pedestal.

19. The shower environment of claim 12 wherein the seat includes a plurality of slots extending entirely through a thickness of the seat from a top surface of the seat to a bottom surface of the seat.

20. A shower environment comprising:
   a seat upon which a user sits in said shower environment, wherein the seat includes a plurality of slots extending entirely through a thickness of the seat from a top surface of the seat to a bottom surface of the seat;
   a first door that is translucent for enclosing a first portion of said shower environment proximal to said seat, said first door having a width correlated to a width of said seat to allow a user easy access to said seat and to said first door to manipulate said first door, said first door extending upwardly from a seat top such that water from a shower does not spray out of said shower environment, said first door not extending downwardly from said seat top; and
   a second door that is translucent, separate from said first door, and in plane with each other if said doors are closed, said second door for enclosing a second portion of said shower environment.

* * * * *

UNITED STATES PATENT AND TRADEMARK OFFICE
CERTIFICATE OF CORRECTION

PATENT NO. : 8,826,472 B2  Page 1 of 1
APPLICATION NO. : 12/533293
DATED : September 9, 2014
INVENTOR(S) : Victor Hoernig It is certified that error appears in the above-identified patent and that said Letters Patent is hereby corrected as shown below:

IN THE CLAIMS:

In claim 12, column 8, line 53; delete "atop" and replace with --a top--

Signed and Sealed this
Twenty-fourth Day of March, 2015

Michelle K. Lee
*Director of the United States Patent and Trademark Office*